March 18, 1930. O. W. FRY 1,750,665
TRUCK CONSTRUCTION
Filed March 19, 1928
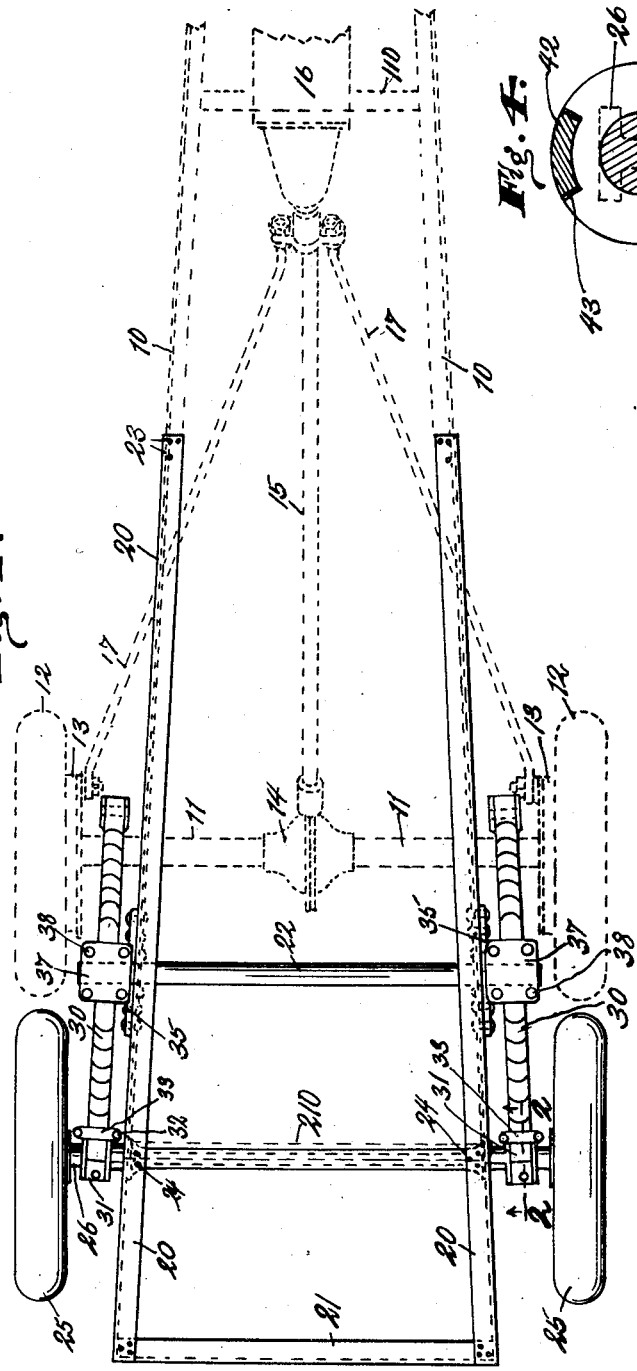
Inventor.
Orlander W. Fry
by
Lockwood & Lockwood,
His Attorneys Patented Mar. 18, 1930

1,750,665

UNITED STATES PATENT OFFICE

ORLANDER W. FRY, OF LOS ANGELES, CALIFORNIA, ASSIGNOR TO O. R. FULLER CO., OF LOS ANGELES, CALIFORNIA, A CORPORATION

TRUCK CONSTRUCTION

Application filed March 19, 1928. Serial No. 262,811.

This invention relates to a motor truck for automobiles having six wheels, the rear portion of the frame being supported on a rear group of four wheels on substantially parallel axles, the front one of which group is a driving axle and the non-driving wheels on the rear axle track those on the driving axle, and a leaf spring at each side of the frame and pivotally connected between its end with said frame and with the ends of the spring mounted on said parallel axles.

The full nature of the invention will be better understood from the accompanying drawings and following description and claims.

In the drawings, Fig. 1 is a plan view, in full lines, of the truck extension, and, in dotted lines, of the rear portion of a standard truck with which said rear extension is secured, the forward portion of the standard truck being broken away and the bed or body being omitted. Fig. 2 is a vertical longitudinal section on the line 2—2 of Fig. 1, showing the extension frame, axle, bearings and the rear portion of a spring in vertical longitudinal section, the remainder of the spring being broken away. Fig. 3 is a central vertical section longitudinally of one end portion of the extension axle and the bearings thereon, the section being on the line 3—3 of Fig. 2 and the remainder of the axle being broken away. Fig. 4 is a transverse section on the line 4—4 of Fig. 3.

The rear truck extension involved in this invention may be added to the rear of a standard motor truck, such as a Ford motor truck, without much modification of the standard truck. In Fig. 1 there is shown by dotted lines a truck frame having side bars 10 and a front cross bar 110 and rear cross bar 210 of a standard truck, which are usually made of channel iron, a rear axle 11, rear wheels 12, brake housing 13 at the inside of said wheels, the usual transmission means 14, 15 and 16 and radius rods 17. None of the foregoing parts need be altered.

The rear extension, which is added to the rear end of the standard truck, has a frame consisting of side bars 20, rear cross bar 21, and an intermediate cross rod 22. The side bars 20 are preferably formed of channel iron of the same character as the side bars 10 of the frame of the standard truck and large enough to overlap the same longitudinally as shown and are rigidly secured thereto by bolts 23 at the front end of the extension frame and bolts 24 at the rear end of the standard truck side bars 10. In the form shown of this rear extension the frame thereof has straight side bars 20, but they need not necessarily be straight excepting in the portions thereof overlapping the side bars 10 of the standard truck frame.

The said rear extension also has a pair of rear wheels 25 mounted on an axle 26 which, intermediate its ends, is T-shaped in cross section, and of substantially the same length as the rear axle of the standard truck, as shown. The said axle of the extension is mounted preferably in the following manner:

The side springs 30 are removed from their positions on the standard truck and placed in the position shown in Fig. 1. In the standard truck those springs extend forwardly from the axle 11 to the frame side bars. The springs are removed from that position and their rear ends mounted on the rear axle 26 of the extension by means shown in Figs. 2 and 3. As seen in Figs. 1, 2 and 3, there is a bearing box 31 mounted on the axle 26 and the rear end of the spring 30 is secured on said bearing box by the bolts 32 and straps 33. Said springs are centrally mounted, as shown. A frame 35 of substantially triangular shape has its upper ends secured to the side bar of the frame and its lower end is mounted on the rod 22. The outer end of rod 22 carries a saddle 35 on which the leaves of the spring are secured by bolts 38 and top plate 37.

In order that the rear wheels 25 may more accurately track the rear wheels 12 of the standard truck, the ends of the axle 26 of the extension are formed as shown in Fig. 3, with a small collar 40 at the outer side of the bearing box 31, and a larger collar 41 at the inner side of the bearing box 31, and those collars are spaced from each other and the bearing box sufficiently to leave ample clearance for slight lateral play or movement of the bearing box on the axle, as rather extravagantly shown in Fig. 3. If the wheels 12 are running in a rut going around a bend the wheels 25 will track them in that rut instead of getting out of the rut and going across the bend. Furthermore the inner bore of the bearing box 31 is formed as shown in Fig. 3, being centrally contracted so as to have proper bearing with the axle and with the ends of said bore flaring somewhat or outwardly inclined. This arrangement enables the axle to rock and the spring and bearing to remain uniformly in the same position when the extension wheel rises or descends in passing over an elevation or a depression in the road. The bearing box has an arm 42 transversely arcuate as shown in Figs. 3 and 4, that lies in a segmental seat or recess 43 therefor that is cut in the collar 41.

While the invention has been herein described with reference to an extended truck, some features of it are not necessarily limited to the particular construction of the truck or automobile frame and may be associated with an automobile frame of any kind with or without any extension.

I claim:

1. In a motor vehicle having a frame, a driving axle, a parallel following rear axle, a leaf spring supporting each side of the frame and with their front ends suitably supported on said driving axle, a bearing for mounting on each spring on said rear axle having its central part formed so as to snugly surround the axle and with the lateral portions of the bearing formed to have a flaring opening so the axle can rock in said bearing.

2. In a motor vehicle having a frame, a driving axle, a parallel following rear axle, a leaf spring supporting each side of the frame and with their front ends suitably supported on said driving axle, a bearing box for mounting the rear ends of each spring on said rear axle having its central part formed so as to snugly surround the axle and with the lateral portions of the bearing formed to have a flaring opening so the axle can rock in said bearing, a rigid collar on said shaft at each side of each bearing arranged to permit and limit its lateral movement relative to the spring, and an arm extending laterally from said bearing box into a notch in one of said collars to prevent any independent rotary movement of the bearing and axle.

In witness whereof, I have hereunto affixed my signature.

ORLANDER W. FRY.